Oct. 26, 1954 J. H. PYE 2,692,914
CONTRACT SALES MACHINE
Filed Jan. 30, 1951 7 Sheets-Sheet 1

INVENTOR
James H. Pye.
BY
ATTORNEYS.

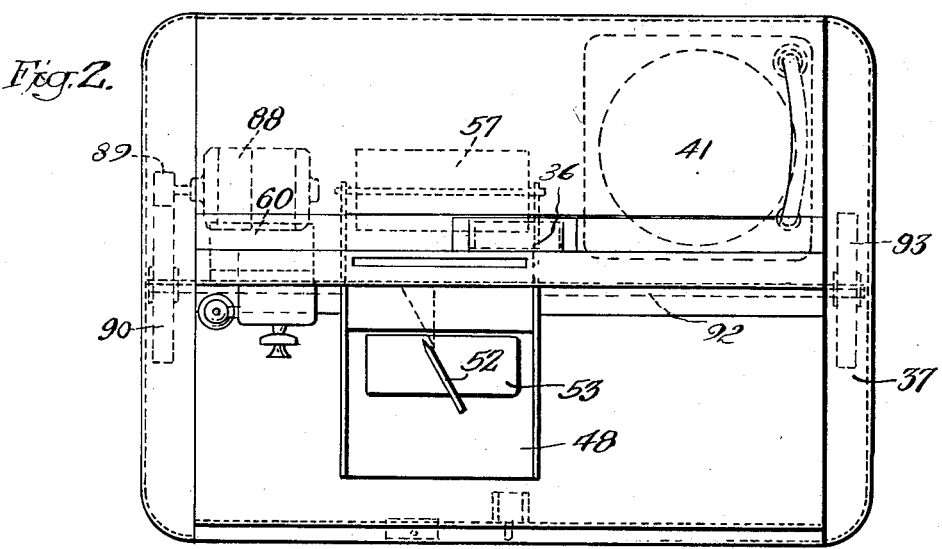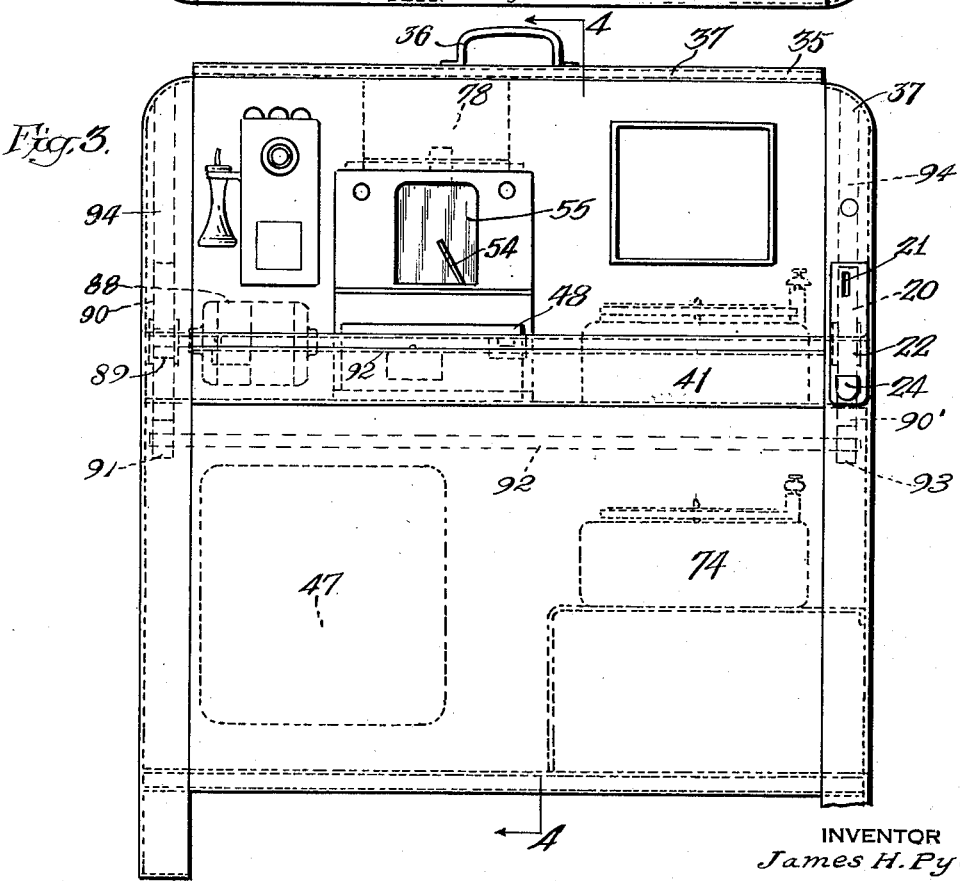

Oct. 26, 1954  J. H. PYE  2,692,914
CONTRACT SALES MACHINE
Filed Jan. 30, 1951  7 Sheets-Sheet 3

INVENTOR
James H. Pye
BY
ATTORNEYS.

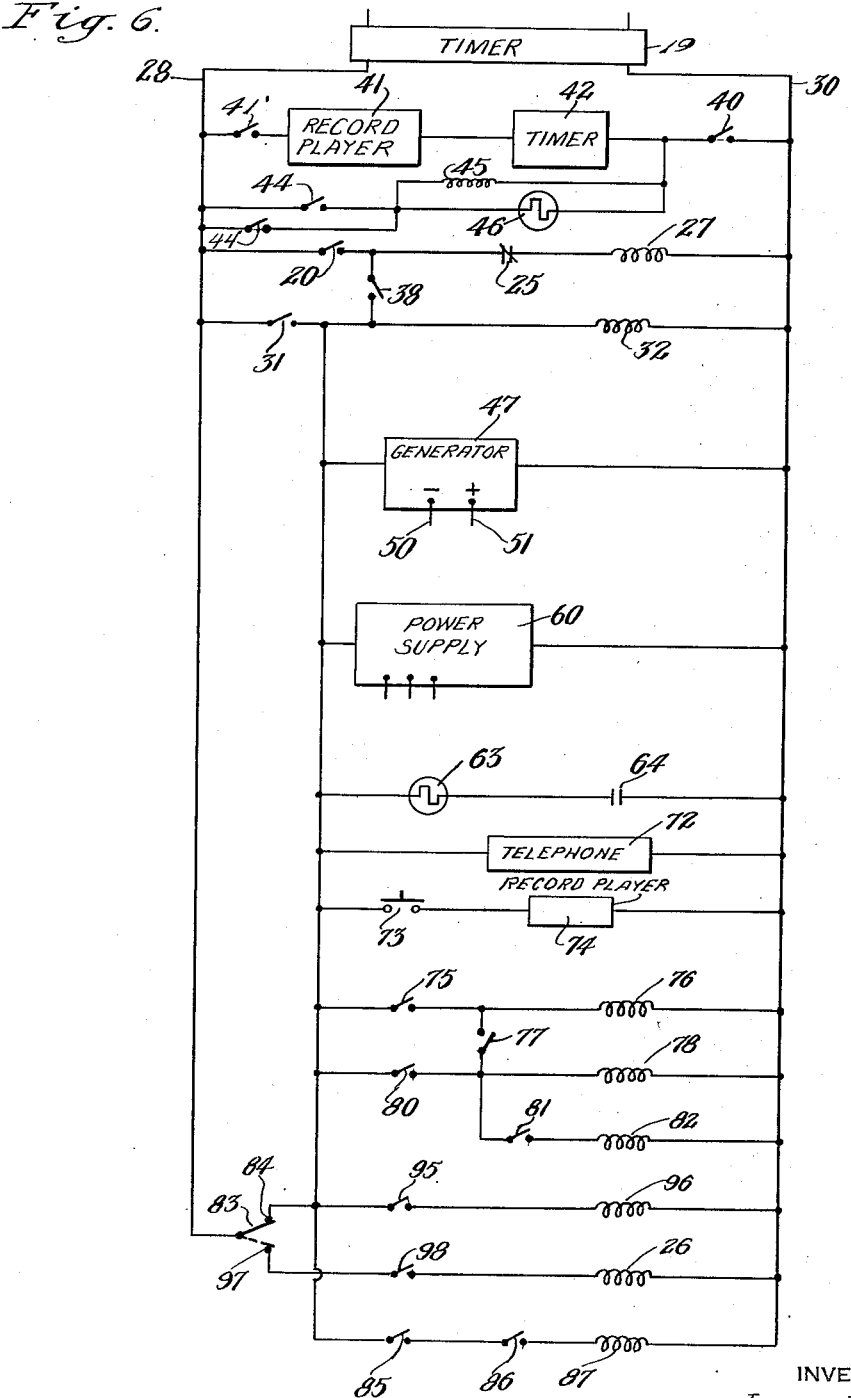

Oct. 26, 1954   J. H. PYE   2,692,914
CONTRACT SALES MACHINE
Filed Jan. 30, 1951   7 Sheets-Sheet 5

INVENTOR
James H. Pye.
BY
ATTORNEYS.

Oct. 26, 1954
J. H. PYE
2,692,914
CONTRACT SALES MACHINE
Filed Jan. 30, 1951
7 Sheets-Sheet 6
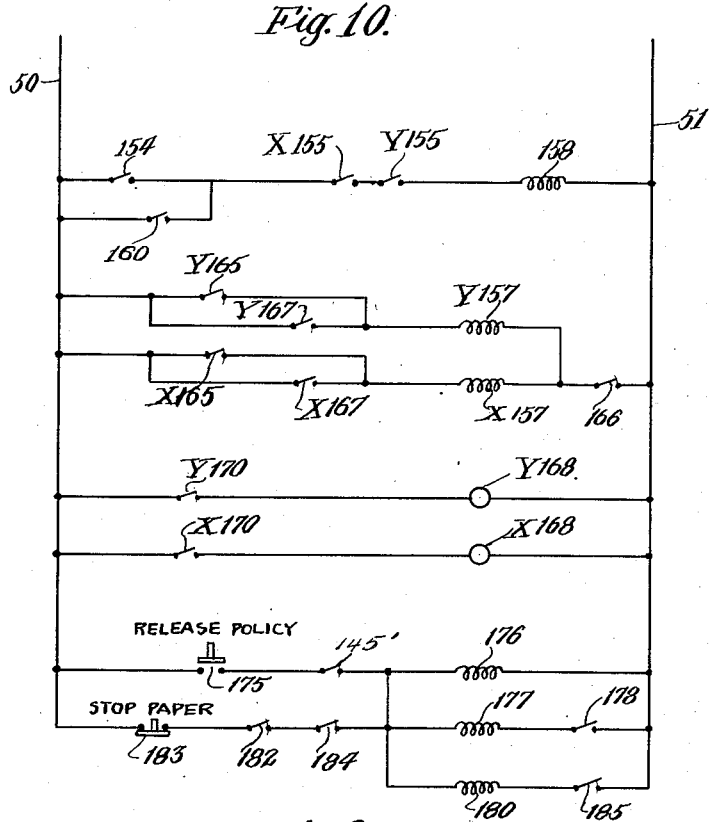
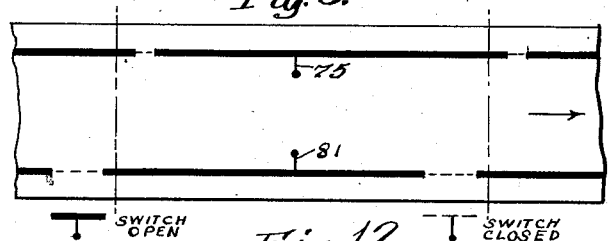
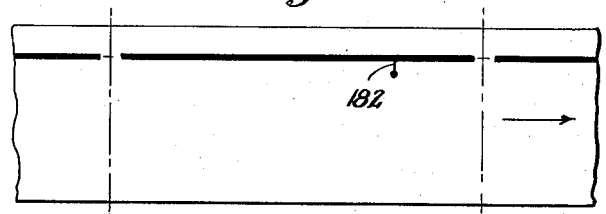
INVENTOR
James H. Pye.
BY
ATTORNEYS.

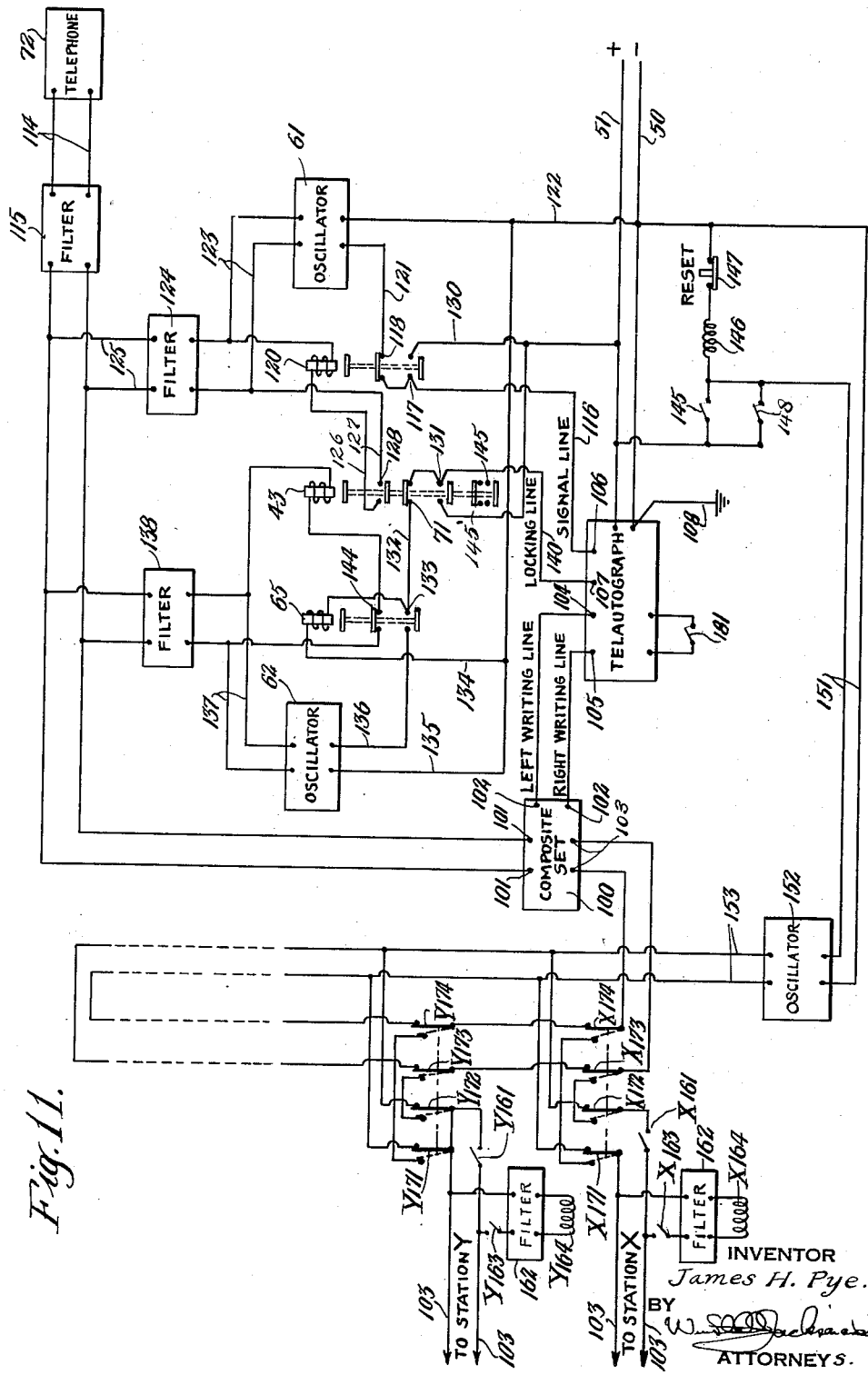

Patented Oct. 26, 1954

2,692,914

UNITED STATES PATENT OFFICE 2,692,914

CONTRACT SALES MACHINE

James H. Pye, Wynnewood, Pa.

Application January 30, 1951, Serial No. 208,467

21 Claims. (Cl. 179—4)

The present invention relates to machines for vending insurance and other contracts.

The present application has been divided, the subject matter directed to the composite telephone and telegraph communication circuits remaining in the present application, and the subject matter relating to the telautograph, relay control circuit and paper feed being embodied in copending application Serial No. 285,523, filed May 1, 1952, for Contract Sales Machine and the Like.

A purpose of the invention is to provide a master station and a dispensing station, to connect the stations by a telautograph system and to permit the completion of a contract of insurance, or the preparation of an offer for such a contract, by means of the telautograph system.

A further purpose is to interconnect the telautograph stations by means of composite sets and desirably to conduct telephonic communication through the same pair of wires.

A further purpose is to employ carrier currents generated by oscillators at the sending station and passing through filters at the receiving station to operate relays at a receiving station in order to actuate the signal and locking terminals of the telautograph.

A further purpose is to employ an additional relay at the sending station to render the receiving relays at that station inoperative and preferably to actuate the additional relay from the locking terminal at the sending station.

A further purpose is to energize the telautograph and desirably also the amplifiers at the sending station by a check controlled switch operating a relay.

A further purpose is to actuate a ready signal at the dispensing station in response to a relay which renders the receiving relays inoperative at that station.

A further purpose is to transmit the signature of an insurance company representative accepting a policy over a telautograph to the dispensing station.

A further purpose is to energize a relay in a dispensing station and preferably at the same time energize a check receptor lock-out and a busy signal by a locking system when any other dispensing station is in operation.

A further purpose is to send out an original locking carrier wave from a dispensing station to a master station and at the master station thereby energize a system locking oscillator and switch all other dispensing stations except the one in use to locking connection with the system locking oscillator.

A further purpose is to energize a system lockout relay at the mastter station by the original locking oscillator, by the system lock-out relay to energize the system locking oscillator, to energize an auxiliary filter control relay which connects auxiliary locking filters in each line and temporarily disconnects each line from the composite set of the master station, to energize an auxiliary filter locking signal relay beyond the auxiliary filter at the line which is in use, and thereby to energize a line switching relay which connects the particular line in use to the composite set and connects all other lines to the system locking oscillator.

A further purpose is to close a policy release switch, to energize a release relay and to energize a pair of forward and reset step relays which alternately deenergize one another, one of the step relays successively opening and closing step contacts in the telautograph.

A further purpose is to control the closing of the door by paper limit switches operated by the contract as it is withdrawn.

A further purpose is to release an electric lock in response to a check controlled switch to permit opening the door of the machine.

Further purposes appear in the specification and in the claims.

In the drawings I have chosen to illustrate one only of the numerous embodiments in which my invention may appear, selecting the forms shown from the standpoints of convenience in illustration, satisfactory operation and clear demonstration of the principles involved.

Figure 2 is a top plan view of Figure 1.

Figure 3 is a front elevation of Figure 1 with the door open.

Figure 6 is a circuit diagram illustrating the general electrical circuit of the machine at a dispensing station.

Figure 8 is a diagrammatic plan view of the paper limit switches at the dispensing station.

Figure 10 is a circuit diagram of the general circuit at the master station.

Figure 11 is a circuit diagram of the telautograph station oscillators and composite set at the master station.

Figure 12 is a diagrammatic plan view of the paper limit switches at the master station.

Figure 1:
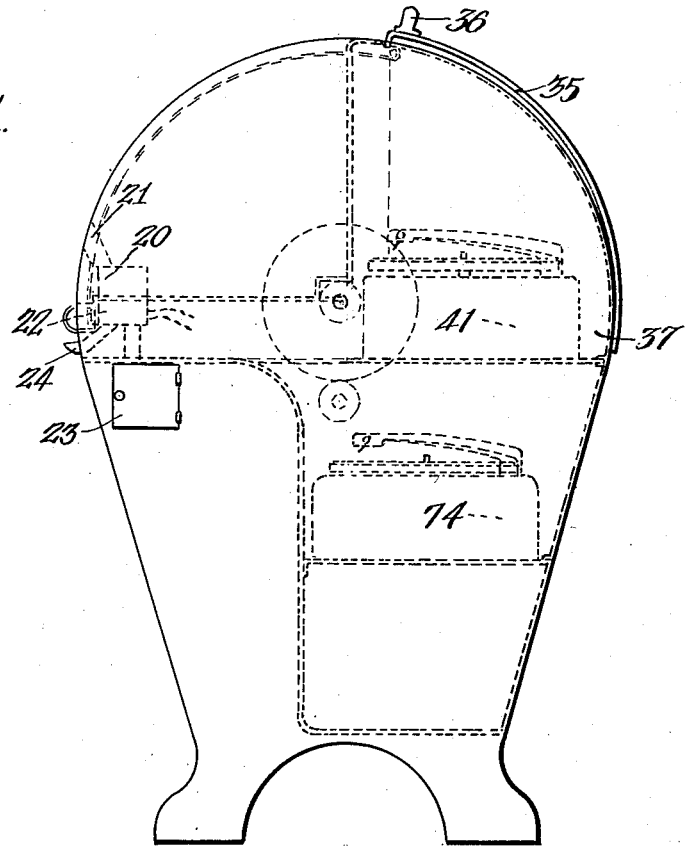
Figure 1 is a diagrammatic end elevation of the contract vending machine of the invention.

Describing in illustration but not in limitation and referring to the drawings:

In the prior art efforts to sell insurance by machine have met with limited success because of the complexity of the equipment and the inability of the customer to obtain requested information. The present invention relates to a vending machine for contracts, especially of insurance, but including other legal documents and is designed to overcome the difficulties of existing equipment.

The sales cost of small insurance policies has been so high that many brokers and agents have been unwilling to handle such policies, in addition to which the minimum premiums charged by the insurance companies very materially increase the cost to the purchaser. The present invention is concerned with a device which will make the sale of very small policies economically feasible.

The machine can be located in public or semi-public places such as railway stations, department stores, public buildings, office buildings or the like. One master or headquarters station may control ten or more dispensing stations within a radius of five miles or more, and using only one operator. A complete record of every transaction is kept at the master station. The customer may pay part or all of the consideration by depositing the necessary coins in the telephone coin box at the machine. If desired, the machine also may operate by allowing the customer to make a payment by a bill of exchange (bank check) or cash paid to the master station.

One of the distinctive features is that the purchaser fills in the policy himself and the insurance company's representative signs the form and/or policy. If desired the operator at the master station can fill in the policy and then sign it. At the same time the purchaser fills in the duplicate form by telautograph at the master station. The purchaser may, if he wishes, talk to the master station by telephone, desirably operating over the same pair of wires as those used by the telautograph. The telephone system may be of the coin box type rather than the talking box type. Questions can thus be asked and the customer may satisfy himself as to any question or doubt.

At the completion of the transaction the insurance company representative may sign the insurance policy on the telautograph thus transmitting his signature to the policy at the dispensing station.

Prior to completion of the transaction the insurance company representative can review each policy and reject any offer not desired.

Due to the authorization to insurance companies in many states to insure multiple lines, that is, issue a single policy covering multiple perils on a single property, the insurance company representative can issue a single policy on several perils.

The transaction, as far as possible, is a single complete unit, resulting in great saving of labor and time to the insurance company, the company's representative and corresponding reductions in cost to the purchaser. The customer can also purchase the policy with a minimum of effort.

Where it is not desired to use the check or coin deposit feature, the policy may be paid for by sending a bill of exchange (bank check) to the headquarters. A suitable bank check form may appear on the policy if desired.

To operate a dispensing station, an electric switch 20 is closed, suitably of the instantaneous contact type. Where the consideration is to be paid for by a bill of exchange, the switch may be any suitably manually operated switch, but normally it will be a check (coin) operated switch of any standard type. In the coin slot 21 (Figure 1) is a suitable slug rejecting coin receiving device 22 as well known, having a coin receiver 23 and a coin return chute 24. It will be evident that the coin switch and associated mechanism may be of any standard commercial form.

A program timer 19 is desirably connected between a suitable power source (suitably 110 volts direct current) and the power leads of the device (Figure 6) to turn off the device at any time (late night, for instance) when the operation is not desired. The program timer, besides the switching which turns on and off the main power source, has advertising cut-off contacts 41' and coin lock-out contacts 44' as later explained.

Figure 5:
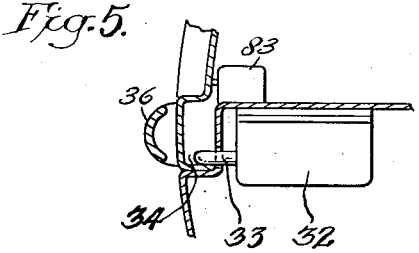
Figure 5 is a further fragmentary enlargement of Figure 4 showing the door locked.

The check operated switch 20 is in series (Figure 6) with normally closed contacts 25 of a release relay 26, and with a cycle starting relay 27 across terminals 28 and 30 of the source energized through program control 19. Direct current is preferred. If alternating current is used, corresponding adjustment may be made by introducing rectifiers for the telautograph and oscillator power supplies. The cycle starting relay 27 has a first set of normally open contacts 31 in series across the line with a latching solenoid 32 (Figures 5 and 6) acting on a latching plunger 33 which is spring urged toward latching position. The latching plunger 33 engages under a latch 34 of an arcuate rotating door 35 covering the front upper segment of the machine at the dispensing station when in closed position and provided with a handle 36. The door rotates in a suitable trunnion within the housing 37 of the dispensing machine.

Cycle starting relay 27 also carries contacts 38 which are in series across the line between check controlled switch 20 and latching solenoid 32 in parallel with normally closed contacts 25 and cycle starting relay 27, normally open contacts 38 holding the cycle starting relay in operation notwithstanding that check controlled switch 20 remains closed only instantaneously. Cycle starting relay 27 is provided with normally closed contacts 40 which are in series across the line with an advertising record player 41 (Figures 1, 2, 3 and 6) and an electric timer 42 which times the operation of the advertising record player. Contacts 41' of program timer 19 are closed whenever the circuit is energized by the program timer. When cycle starting relay 27 picks up and normally closed contacts 40 open, the advertising record player and timer cease to function as long as the customer is operating the dispensing station. As later explained, an instruction record player is available at the dispensing station to tell the customer what to do.

If any unit of the system is in operation with the master station, lock-out receiving relay 43 (Figure 7) of each other station will pick up, as later explained, due to the locking carrier wave received at each other station, and normally open contacts 44 (Figures 6 and 7) of lock-out receiving relay 43 are closed. At this time, parallel contacts 44' of program timer 19 are open, contacts 44' being closed only when it is not desired to permit operation of the station, although the advertising record player 41 may be operating. This energizes check (coin) lock-out solenoid 45 at the locked out dispensing stations and the armature of the solenoid closes the connection from the coin slot 21 into the coin receiver 23 and diverts the coin into the coin return slot 24. The closing of normally open contacts 44 also energizes busy signal 46 at each locked out station, suitably operating a buzzer or lamp to worn the prospective user that the machine is busy and will not accept his coin.

If the system is not busy, the insertion of a check (coin) will energize cycle starting relay 27 as above set forth. Contacts 31 and 36 reduce the surge of current passing through the coin operated contacts.

As soon as cycle starting relay 27 is energized a number of effects occur due to a number of parallel circuits between the normally open contacts 31 and the opposite side of the line. One of these parallel circuits includes the direct current generator 47 for the telautograph station 48. The generator has a negative power connection 50 and a positive power connection 51 which supply power to the dispensing station telautograph shown in Figure 7. As long as all stations are reversed together, the polarity of terminals 50 and 51 could be reversed so that connection 50 is positive and connection 51 is negative. The telautograph is desirably of conventional character, as for example that shown in Van Nostrand U. S. Patent 1,623,220, granted April 5, 1927, for Telautograph System.

Figure 4:
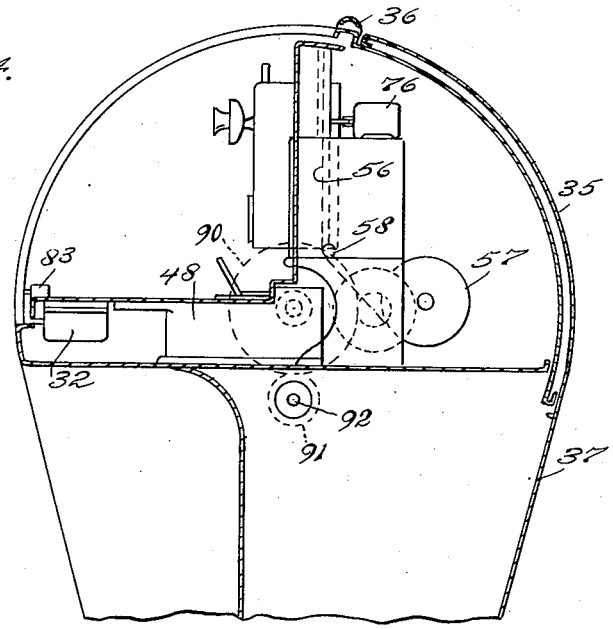
Figure 4 is a fragmentary section of Figure 3 on the line 4—4.
Figure 4A:
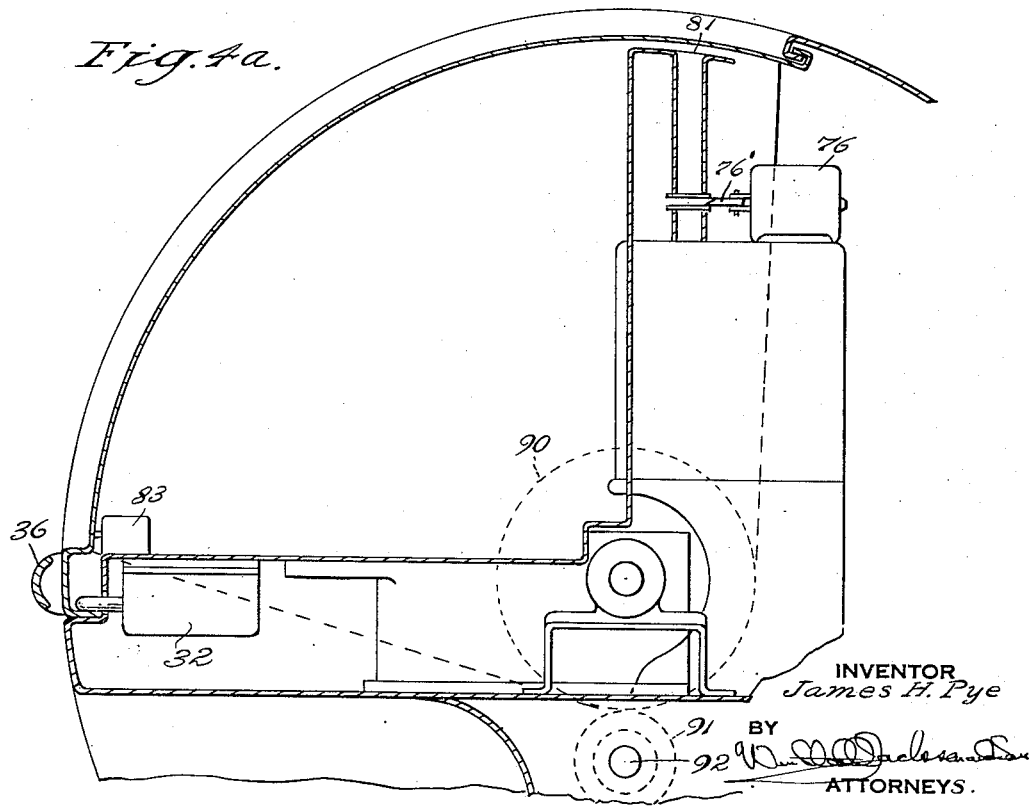
Figure 4a is a fragmentary enlargement of Figure 4.

The telautograph is provided with a special pencil or stylus 52 (Figure 2) and rides on a steel plate or bed 53 which may, if desired, have a master form of the policy printed thereon. By so doing, as well known, a special ink pen 54 (Figure 3) inside the telautograph window 55 fills in a paper form 56 (Figure 4) fed continuously from a roll 57 over a guide roller 58. At the same time, at the master station at headquarters the telautograph records the identical information on a paper form there located.

Figure 7:
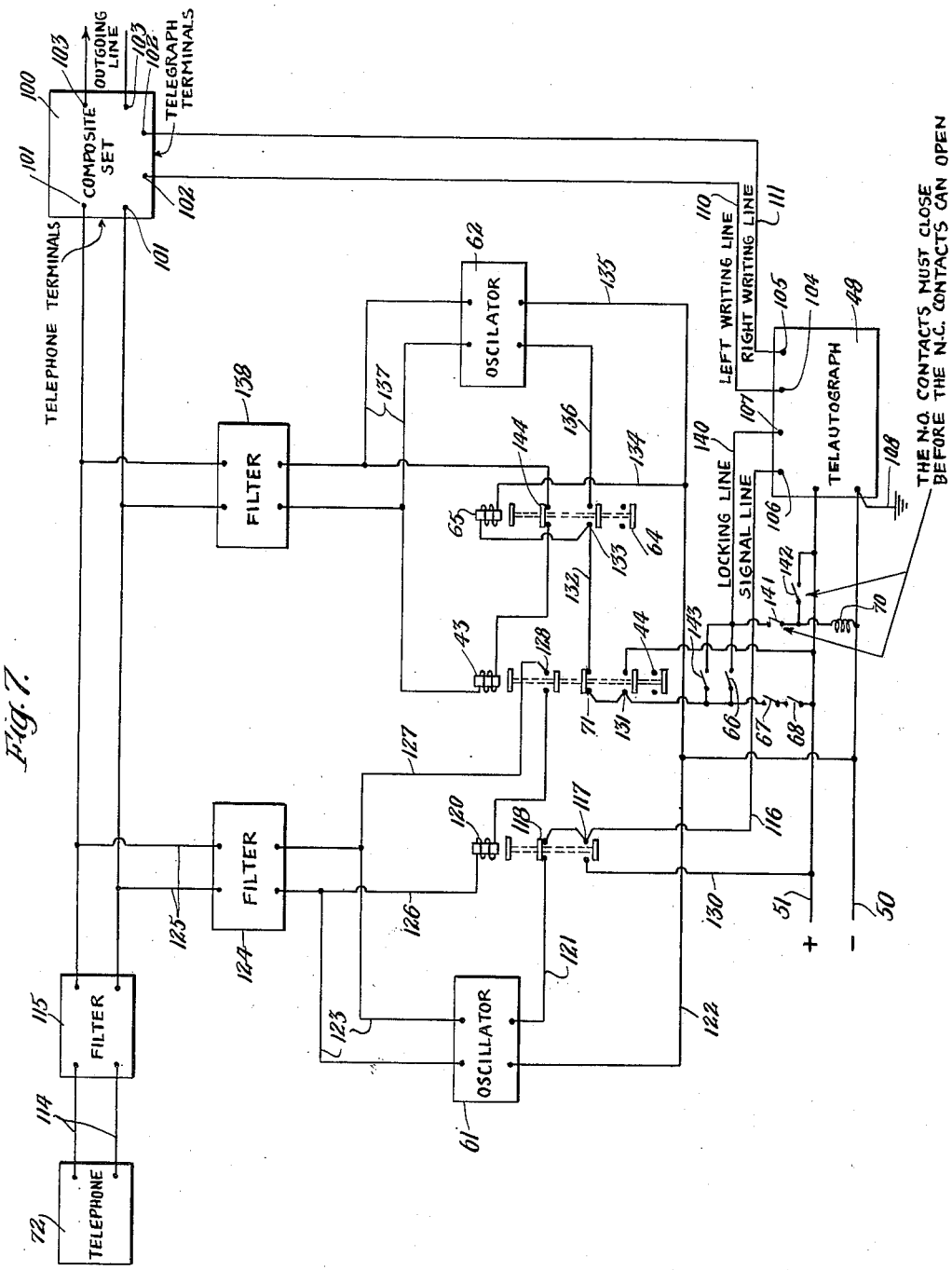
Figure 7 is a circuit diagram of the circuit connected with the telautograph station oscillators and composite set at a dispensing station.

Also connected in series with the normally open contacts 31 across the line is the power supply 60 of signal oscillator 61 and original locking oscillator 62 (Figure 7). Similarly connected in series with normally open contacts 31 and in another parallel branch is a ready signal 63 (such as a lamp or buzzer) in series with normally open contacts 64 of locking signal transmitting relay 65 (Figure 7). Cycle starting relay 27 includes normally closed contacts 66 and normally open contact 67 (Figure 7) and when the relay picks up contacts 66 open and contacts 67 close passing energy from generator 47 and power leads 50 and 51 through normally closed contacts 68 of locking shift relay 70, through normally open contacts 67 in closed position, through normally closed contacts 71 of lock-out receiving relay 43 and then through locking signal transmitting relay 65 to the opposite side of the source. Closing of normally open contacts 64 by locking signal transmitting relay 65 operates ready signal 63, which is suitably an electric light.

Also in parallel with the other branches and in series with normally open contacts 31 across the line is telephone 72 (Figure 6) on which the user can call up the operator in the master station for instructions. The telephone may be an ear phone and coin box device. In a separate parallel branch is push button 73 and instruction record player 74 (Figures 1, 3 and 6).

In a separate parallel branch across the line in series with normally open contacts 31 is normally closed paper limit switch 75 which is held open by the policy passing through the telautograph machine at this stage so that paper knife solenoid 76 (whose armature carries the spring return paper knife 76') in series therewith which operates the paper knife is not energized at this stage of the operation.

In series with normally open contacts 31 of cycle starting relay 27 and in series with paper limit switch 75 and in parallel with paper knife solenoid 76 across the line are normally closed contacts 77 of dispensing station release control relay 78, and also relay 78 itself. Normally open contacts 80 of dispensing station release control relay 78 are in series with normally open contacts 31 of cycle starting relay 27 and relay 78.

A second normally closed paper limit switch 81 is in a branch in series with door closing relay 82 and in parallel with dispensing station release control relay 78, but in series with normally open contacts 80 of relay 78 and normally open contacts 31 of cycle starting relay 27.

When door lock solenoid 32 is energized the door is unlocked. Door closing limit switch 83 is in contact with contact 97 of the single pole double throw switch until the door opening motor 88 has partially opened the door. Then the door closing limit switch 83 is in contact with contact 84 of the single pole double throw switch. In this position although an interruption of electric power to terminals 28 and 30 would allow contact 31 to open, the dispenser could operate as soon as electric power was restored without the use of a second check. The normally open contacts 31 of cycle starting relay 27 are in series with and complete the circuit from line terminal 28 to the opposite side of the line in series through normally closed door opening limit switch 85, normally closed contacts 86 of door closing relay 82 and door opening motor winding 87 (which is desirably one winding of door motor 88, Figures 2 and 3). The door motor 88 drives through its speed reduction to a pinion 89 which meshes with a gear 90 which meshes with pinion 91 on one end of a door cross shaft 92 which extends across the machine and carries a pinion 93 at the opposite end. Pinion 93 intergears with a gear 90' at the opposite end of the machine. Door segments 94 fastened to gears 90 and 90' move with the gears at the opposite ends to open and close the door. The door continues to open until it is completely open when it contacts door opening limit switch 85, opening the circuit of door opening motor winding 87 and stopping the motor.

When the policy or other contracts is completely filled in, the user places the pen or stylus 52 in the holder at the dispensing station and the operator at the master station causes the contract to be fed out of the telautograph as later explained. Almost at the end of the policy advance an opening in the policy permits paper limit switch 75 to close, energizing the paper knife solenoid 76 which cuts off the completed policy. This also applies energy through normally closed contacts 77 of dispensing station release control relay 78, energizing the relay and closing normally open holding contacts 80 which hold the relay energized.

In its final advance, the policy opens paper limit switch 75. Since the contract forms are of uniform length, paper limit switch 75 can be at any point along the form at the telautograph and is not influenced by the action of the paper knife.

As the completed form is stepped up or fed out of the telautograph it opens paper limit switch 81, which opens before paper limit switch 75 closes (Figure 8).

The customer completes the operation of the dispensing unit as shown in Figure 6 by removing the filled out policy which allows paper limit switch 81 to close. When paper limit switch 81 closes, this energizes door closing relay 82 through normally open contacts 31 of cycle starting relay 27, normally open contacts 80 of dispensing station release control relay 78 and paper limit switch 81. Door closing relay 82 closes normally open contact 95 and energizes door closing motor 96 (preferably a separate winding of door motor 88) which turns the door motor in the direction to close the door. The door motor stops when the door is completely closed, at which time door limit switch 83 is shifted by the door into position in electrical connection with contact 97, breaking contact 84. At the time that door closing motor 96 is operated to close the door through normally open contacts 95, door opening motor 87 is deenergized because normally closed contacts 86 of door closing relay 82 are now open and door opening motor 87 is not energized even after the door opens enough to allow door opening limit switch 85 to close.

When door closing limit switch 83 is shifted to the position to make contact 97, release relay 26 is energized by current flowing through normally open contacts 98 of dispensing station control relay 78 which are then closed by energization of relay 78. The energizing of release relay 26 breaks normally closed contacts 25 of release relay 26, deenergizing cycle starting relay 27 which deenergizes all the relays and power supplies except the source 28, 30. Latching solenoid 32 resets and holds the door closed until a new user inserts a coin to operate the dispensing station device. The door motor is deliberately made slow and weak enough so that no danger of personal injury to the user arises from the device.

The circuit for operation of the telautograph and the telephone at the dispensing station is shown in Figure 7. The circuit of Figure 7 allows a single pair of telephone wires to carry a telephone conversation plus the telautograph signals between the dispensing station and the master station. The circuit includes what is known in the telephone and telegraph industries as a composite set 100, which has telephone terminals 101, telegraph terminals 102 and an outgoing line 103. This allows each side of the telephone pair of lines to be used for separate telegraph circuits as well as for simultaneous telephone use. Any well known composite set may be used, for example that described in Standard Handbook for Electrical Engineers (7th Edition, McGraw-Hill Book Co.), page 2065, or other similar publication. The telautograph station 48 may be of any well known type, for example that described in U. S. Patent No. 1,623,220 above referred to. It has a left hand writing terminal 104, a right hand writing terminal 105, a signal terminal 106, a locking terminal 107, a positive power connection 51 and a negative power connection 50. Direct current power is supplied in any suitable manner, as from the local generator or rectifier 47 at each station, provided each station is properly grounded.

In the present instance the negative side is grounded at 108. The left hand and right hand writing terminals 104 and 105 are connected by connections 110 and 111 to the telegraph terminals of the composite set. The outgoing pair of wires 103 interconnect the dispensing station with the master station to be described, and where there are several dispensing stations there are several pairs of wires 103 going out to them as later described. There is but one pair of lines for each dispensing station. The signal terminal and locking terminal voltages are transmitted through the telephone system by carrier currents as explained below.

Figure 9:
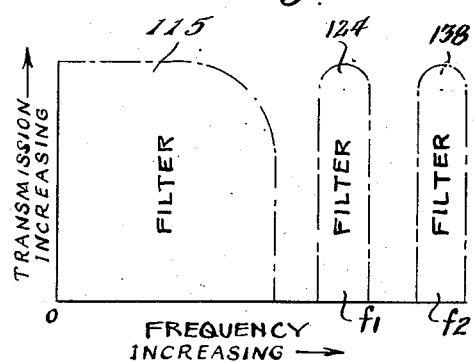
Figure 9 is a diagram showing the frequencies of the oscillators and the frequencies passed by the filters.

The telephone 72 is energized as explained above in connection with Figure 6. The telephone on the communication side is connected by lines 114 through filter 115 to the telephone terminals 101 of the composite set. The telephone 72 in Figure 7 may be a standard unit with coin box which accepts nickels, dimes and quarters. As shown in Figure 9, filter 115 passes on low frequency up to a definite cut-off frequency of the filter. To any frequency higher than the cut off frequency filter 115 acts like an open circuit. As well known in telephone practice, filter 115 has cut-off frequency high enough to allow understandable voice transmission, cutting off only frequency not necessary to understand the voice. At the master station of Figure 11, a similar filter 115 removes any carrier current frequency beyond the cut-off frequency and permits the frequency used in telephoning to pass through the telephone 72 without interference.

A voltage at the signal terminal 106 of the telautograph passes through signal line 116 to one of the normally open contacts 117 and also to one of the normally closed contacts 118 of signal receiving relay 120. From the opposite side of the normally closed contacts 118, line 121 connects with one input terminal of signal oscillator 61, the other input terminal being connected by line 122 with the negative side 50 of the source.

The output terminals of signal oscillator 61 connect by connections 123 with signal filter 124 which on the other side is connected by connections 125 with the telephone terminals 101 of the composite set in parallel with the connections from telephone filter 115.

Signal oscillator 61 thus is caused to generate a frequency $f_1$, which is slightly higher than the cut-off frequency of telephone filter 115. Signal filter 124 passes only this signal frequency to the composite set and thence to the master station. In the master station a similar signal filter 124 passes this signal frequency and allows signal receiving relay 120 to be energized, since it is connected to signal filter 124 by connections 126 and 127 passing through normally open contacts 128 of lock-out receiving relay 43. Relay 43 is energized as described later, causing contacts 128 to be closed. When the signal receiving relay 120 (in the master station, Figure 11) is energized, it closes normally open contacts 117 of relay 120 and connects signal line 116 from signal terminal 106 to the positive side of the source 51 by lead 130.

When a coin is deposited in the coin slot and cycle starting relay 27 is energized, normally closed contacts 66 open and normally open contact 67 close, connecting the positive side 51 of the source through normally closed contacts 68 of locking shift relay 70, through normally open contacts 67 (in closed position) of cycle starting relay 27, to one of the normally open contacts 131 and to one of the normally closed contacts 71, both of lock-out relay 43 (Figure 7). The opposite side of normally closed contact 71 connects through lead 132 with one of the normally open contacts 133 of locking signal transmitting relay 65 and also through locking signal transmitting relay 65 and lead 134 to the negative side of the source. A branch lead 135 from lead 134 connects to the input of original locking oscillator 62. When the normally open contacts 133 of locking signal transmitting relay 65 are closed by energizing relay 65, the normally open contact 133 is connected by lead 136 to the opposite side of original locking oscillator 62. As soon as cycle starting relay 27 is energized, locking signal transmitting relay 65 is therefore energized, applying energy to the input of original locking oscillator 62. The output of original locking oscillator 62 is connected by leads 137 with locking filter 138 which is connected to telephone terminals 101 of the composite set, in parallel with the telephone filter and the signal filter. The frequency $f_2$ of locking filter 138 is slightly higher than the frequency $f_1$ of signal filter 124 as shown in Figure 9, but is still well within the minimum frequency capabilities of modern telephone practice. This locking filter 138 corresponds in frequency to original locking oscillator 62 and passes only frequency $f_2$, while signal filter 124 corresponds in frequency with signal oscillator 61 and passes only frequency $f_1$. At the master station frequency $f_2$ passes through locking filter 138 (Figure 11) and operates lock-out receiving relay 43 to apply voltage from the source to the locking terminal 107 of the master station telautograph.

When the customer starts to write by picking up the pen, energy is applied to the locking terminal 107 in the dispensing station telautograph, energizing locking line 140. This causes current to flow through normally closed contacts 141 of locking shift relay 70, energizing relay 70 and closing normally open contacts 142 of the same relay. Normally open contacts 142 when closed hold locking shift relay 70 in operation. When locking shift relay 70 picks up, normally open contacts 143 of locking shift relay 70 close, connecting locking terminal 107 and locking line 140 through normally closed contacts 71 and normally open contacts 133 (in closed position) with the input of original locking oscillator 62 at the dispensing station. At the same time, the locking action previously applied through normally closed contacts 68 of locking shift relay 70 ceases and the locking impulse sent out through locking filter 138 depends upon the use of the pen by the user and ceases when the user puts the pen down as well known in telautograph practice. Therefore, when the user puts the pen down, the dispensing station can receive telautograph impulses from the master station which will produce writing on the policy or other contract at the dispensing station.

Locking signal transmitting relay 65 has a set of normally closed contacts 144 which are in circuit with lock-out receiving relay 43 across the input side of locking filter 138, to keep lock-out receiving relay 43 from operating as long as the pen at the dispensing station is in use.

At the master station shown in Figure 11, the composite set, telautograph filters 124 and 138, telephone filter 115, oscillators 61 and 62 and relays 43, 65 and 120 are connected in the same way as at the dispensing station as shown in Figure 7, except that normally open contacts 67, and normally closed contacts 68 of cycle starting relay 27 are omitted, and locking shift relay 70 and its contacts 68, 141, 142 and 143 are omitted, and contact 145' of lock-out relay is added. The differences in the circuit of Figure 11 (taken with Figure 10) from Figure 7 will now be described.

The telephone 72 in Figure 11 will desirably be the same as that used by long distance telephone operators, so that the master station operator can collect the price of the policy before signing or validating the policy.

After a customer has deposited a coin in the coin slot of a particular dispensing station, which for convenience will be described as station "X," a locking signal is produced at this station as already described. This locking signal passes through contacts X171 and X172 in right hand position as shown, thence to lines 153, thence through contacts 173 and 174 of any dispensing stations similar to X and Y, and thence through Y173 and Y174, and thence through X173 and X174 to terminals 103 of the composite set and thence through the composite set and through locking filter 138 of the master station, energizing lock-out receiving relay 43 at the master station. The energizing of lock-out receiving relay 43 closes normally open contacts 145 on this relay, applying energy through system lock-out relay 146 and normally closed reset switch 147. When system lock-out relay 146 picks up it closes normally closed open contacts 148 which hold system lock-out relay 146 closed, and applies energy from power terminals 50 and 51 to input leads 151 of system locking oscillator 152. System locking oscillator 152 sends out a strong locking signal at locking frequency $f_2$ to the entire system through locking lines 153. The distribution of this locking carrier wave to the system is described below in connection with a description of the switching.

Considering now Figure 10, system lock-out relay 146 also is provided with normally open contacts 154 in series across the line with normally closed contacts X155 and Y155 respectively of line switching relays X157 (for station X) and Y157 (for station Y), and also with auxiliary filter control relay 158. Auxiliary filter control relay 158 closes normally open contacts 160 which hold the relay closed notwithstanding the opening of contacts 154 of system lock-out relay 146. Auxiliary filter control relay 158 (Figure 10) has normally closed contacts X161 and Y161 (Figure 11) in the lines 103 of the respective stations, which disconnect the lines of any dispensing station from the master station when auxiliary filter control relay 158 is energized. An auxiliary filter 162 is interposed across the line 103 of each station in series with normally open contacts X163, Y163, etc. of auxiliary filter control relay 158. Auxiliary locking filter 162 is of the same character and passes the same frequency range $f_2$ as locking filter 138. The auxiliary filter control relay 158 isolates each station from signal feed back from any other station. On the output side of each auxiliary locking filter 162 is an auxiliary filter locking signal relay X164, Y164, etc. The dispensing station sending the locking signal causes the appropriate relay in this case X164, to pick up.

Auxiliary filter locking signal relay X164, in common with the other similar relays in the other lines, has a normally open contact X165

(Figure 10) in series with line switching relay X157 and with a normally open contact 166 of system lock-out relay 146. Line switching relay X157 has normally open contacts X167 which shunt contacts X165 and hold the relay closed. An exactly similar construction is provided for line switching relay Y157 and any other similar relays for the individual dispensing stations. A series of signal lights individual to the different line switching relays 157 designated as X168 and Y168 are energized by normally open contacts X170 and Y170 on line switching relays X157 and Y157 respectively. Each of the line switching relays 157 has a contact X155, Y155, etc. which is in series with auxiliary filter control relay 158 and is normally closed and does not open until all other contacts of the line switching relay 157 close when the relay is energized, as well known in the art. The opening of contacts X155 or Y155 deenergizes auxiliary filter control relay 158 and the deenergization of auxiliary filter control relay 158 closes the various normally closed contacts 161 and connects the lines from all dispensing stations to the main bus of the master station. The line switching relay 157 for each dispensing station carries a series of single pole double throw switches respectively designated as X171, X172, X173, X174 for relay X157, Y171, Y172, Y173, Y174 for relay Y157, etc. (Figure 11). When the particular line switching relay, say X157, is energized these switches are thrown to the left hand position of Figure 11, connecting the particular dispensing station whose relay 157 is energized with the incoming terminals of the composite set of the master unit. All other dispensing stations whose relays are not energized remain disconnected from the master station composite set and are connected to locking signals from system locking oscillator 152, which transmits at the same frequency as original locking oscillator 62.

The telautograph system now permits the policy to be filled out by the customer, or by the operator at the master station or by both of them, only one writing at one time, and neither station able to break in until the other has finished.

When the policy has been completely filled out and executed, the operator at the master station pushes release policy switch button 175, which connects release relay 176 across the line through contacts 145' of lock-out relay 43 (Figure 11) (when the pen at the dispensing station is returned to its holder) and also connects forward step relay 177 in series with normally closed contacts 178 of reset step relay 180 across the line (Figure 10). Forward step relay 177 has a normally open contact 181 (Figure 11) which when closed connects the paper advance terminals of the telautograph (as well known in the art), advancing the contract forms at both the master and the active dispensing station one step. When the form advances paper limit switch 182 (Figure 10) at the master station is closed by the form, thus holding release relay 176 and forward step relay 177 closed notwithstanding opening of the policy release switch 175, by current flowing through normally closed paper stop switch 183, paper limit switch 182 and normally open contacts 184 (in closed position) of release relay 176.

In a separate branch of the circuit parallel with release relay 176 and in series with paper limit switch 182, paper stop switch 183 and normally open contacts 184 is reset step relay 180 in series with normally open contacts 185 of forward step relay 177. As soon as reset step relay 180 is energized it opens normally closed contacts 178 and deenergizes forward step relay 177. When forward step relay 177 is deenergized it opens paper advance contacts 181, resetting the policy advance mechanism of the telautograph (Figure 11) and deenergizes back step relay 180. When back step relay 180 deenergizes, forward step relay 177 is again energized. This step-by-step alternate energization and deenergization of step relays 177 and 180 continues until paper limit switch 182 is opened due to an opening at the end of the contract form. This stops the advance of the policies at both stations.

After the customer has removed his policy and the switch 81 has closed at station X, the operator at the master station pushes reset button 147 which unlocks the entire system by deenergizing system lock-out relay 146, opening contacts 148 and deenergizing system locking oscillator 152. Also contacts 166 open, deenergizing line switching relay X157. A user at station Y or any other station can then proceed to operate the device.

*Operation*

In operation it will be understood that the customer passing by the machine hears the contract advertised by electrical phonograph 41 operating under control of timer 42 with suitable automatic record changers as desired. This advertising device remains in operation until normally closed contact 40 (Figure 6) of cycle starting relay 27 opens as later explained.

When the customer desires to operate the machine he inserts a coin in coin slot 21, closing check controlled switch 20 momentarily. The coin, assuming it passes the slug rejector, enters coin box 23 unless the system is busy. If the system is busy, the locking signal from system locking oscillator 152 and passing through switches 171, 172 in the left hand position of Figure 11 goes through composite set 100 (Figure 7), and locking filter 139 and energizes lockout receiving relay 43, closing normally open contacts 44 (Figure 6) which operates busy signal 46 and also energizes coin lock-out solenoid 45, causing the coin to be rejected into coin return slot 24.

Assuming that the customer has found the system free, or has waited until the busy signal has ceased, the closing of the check controlled switch 20 in the absence of the busy condition energizes cycle starting relay 27. This closes normally open contacts 31 (and at the same time opens normally closed contacts 40 to prevent operation of the busy signal). Latching solenoid 32 is energized and releases the door, energy is applied to the generator for the telautograph and to the power supply 60 (Figure 6) for the oscillators 61 and 62 (Figure 7) the ready signal 63 (Figure 6) is operated, telephone 72 is placed in operation and instruction record player 74 is rendered available for operation by pressing push button 73.

Paper limit switch 75 is open (Figures 6 and 8) and prevents operation of the paper knife solenoid at this time. Door opening motor winding 87 of door opening motor 88 is energized, and the door is motor driven to opening position until door opening limit switch 85 is opened by the door and disconnects the opening motor.

When cycle starting relay 27 closes, a preliminary locking signal is sent out as follows by the circuit of Figure 7.

Normally closed contacts 66 of cycle starting relay 27 open and normally open contacts 67 of the same relay close, transmitting a locking signal from power terminal 51 of the telautograph of the particular operating dispensing station through normally closed contacts 68 of locking shift relay 70 in closed position, through the closed normally open contacts 67 of cycle starting relay 27, through normally closed contacts 71 of lock-out receiving relay 43 and then through locking signal transmitting relay 65 and lead 134 to the opposite side of the power source. Locking signal transmitting relay 65 then picks up, opening normally closed contacts 144 in the circuit of lock-out receiving relay 43 and thus preventing relay 43 from being energized. Lock-out receiving relay 43 is energized only when the particular station is locked out. Normally open contacts 133 of lock-out transmitting relay 65 close and connect to the positive side of the source through normally closed contacts 71 of lock-out receiving relay 43 in closed position, normally open contacts 67 (in closed position) of cycle starting relay 27 and normally closed contacts 68 of locking shift relay 70, and to the input side of the original locking oscillator 62, thus energizing the locking oscillator. The opposite side of the input of locking oscillator 62 is connected to the negative side of the source. Signal relay 120 cannot be energized as normally open contacts 128 in its relay circuit are open.

Original locking oscillator 62 sends out a locking carrier wave through locking filter 138 to the telephone terminals 101 of composite set 100 and thence to outgoing line 103 to the master station.

Referring now to Figure 11, at the master station the locking carrier wave passes through normally closed contacts X161 (it being assumed that station X is operating) and switches X171 and X172 in their right hand position, then along the bus bars through switches Y173, Y174 and X173, X174 in their right hand position to composite set 100. From the composite set the locking carrier wave passes through locking filter 138 and causes lock-out receiving relay 43 to be energized. Normally open contacts 145 of lock-out receiving relay 43 are closed, energizing system lock-out relay 146, and normally open contacts 148 of system lock-out relay 146 close and hold the system lock-out relay closed, and energize system locking oscillator 152 at the master station. This system locking oscillator sends out a strong locking carrier wave through lines 153 and switches Y171, Y172 in the right hand position to station Y, and to each other similar locked out station. At station Y and at each similar station as seen in Figure 7, this locking carrier wave passes through composite set 100, filter 138 and causes lock-out receiving relay 43 to be energized.

The energizing of lock-out receiving relay 43 opens normally closed contacts 71, and thereby opens the circuit of locking signal transmitting relay 65 so that original locking oscillator 62 cannot be energized. At the same time signal oscillator 61 remains inoperative because its signal terminal 109 has no energy.

As seen in Figure 10, normally open contacts 154 of system lock-out relay 146 are in series through normally closed contacts X155 and Y155 with auxiliary filter control relay 158, and relay 158 is therefore energized, closing its normally open contacts 160 which shut normally open contacts 154 and hold auxiliary filter control relay 158 in operation. Relay 158 has normally closed contacts X161, Y161 in the line of each station (see Figure 11). These normally closed contacts X161, Y161 open. Normally open contacts X163, Y163 for each station close when auxiliary filter control relay 158 is energized and connect auxiliary locking filters 162 (which respond to the same frequency as locking filters 138) to each pair of incoming lines and at the same time isolate each station from signal feed back from any other station. The station which is sending out its locking signal causes the appropriate auxiliary locking filter to pass energy which causes the corresponding auxiliary filter locking signal relay X164 to be energized, closing normally open contacts X165 in series with a line switching relay X157 and in series with normally open contacts 166 (now closed) of system lock-out relay 146.

Line switching relay X157 closes normally open contacts X167 which shunt normally open contacts X165 and hold line switching relay X157 energized. Normally closed contacts X155 of line switching relay X157, which cannot open until normally open contacts X167 close, deenergize auxiliary filter control relay 158, which allows contacts X161 to close (Figure 11). Relay X157 when it energizes moves switches X171, X172, X173 and X174 to the left hand position, thus connecting lines 103 from station X to the composite set of the master station and at the same time leaving the lines from all the other stations connected to the locking signal being generated by system locking oscillator 152.

A customer, for example at station X, will normally press the push button 73 (Figure 6) and listen to the instruction record player 74, or in some cases talk on the telephone 72 with the master station. When adequately instructed, the customer will take hold of the special pencil or stylus 52 (Figure 2) and write on the steel pad or plate 53 filling in the information required for the insurance policy or other contract.

This energizes locking terminal 107 of telautograph dispensing station X as well known in the art, and the energizing of locking terminal 107 causes current to pass through normally closed contacts 141 of locking shift relay 70 (Figure 7), which makes locking shift relay 70 pick up. When locking shift relay 70 picks up it closes normally open contacts 142 of relay 70, causing relay 70 to remain energized. When locking shift relay 70 picks up it also closes normally open contacts 143, which transmits the locking signal from locking line 140 through normally closed contacts 71, lead 132 and locking signal transmitting relay 65, causing locking signal transmitting relay 65 to remain energized and thus continuing to transmit the locking signal to the master station as long as the pen is being used. When, however, the pen is put down, the master station can take over the function of writing, and can write on the policy (make necessary signatures), which is filled out in duplicate originals at the master station and at the dispensing station. It is not possible, however, for both the dispensing station and the master station to write at the same time. The picking up of locking shift relay 70 opens normally closed contacts 141 and thus discontinues the continuous locking signal previously transmitted from positive power terminal 51 of the telautograph and makes the locking signal dependent upon the use of the pen, continuing while the pen is in use and ceasing when the pen is not in use.

The energizing of lock-out receiving relay 43 (Figure 11) at the master station closes normally open contacts 128 of this relay and completes the circuit of signal relay 120 connected to filter 124. Likewise the energizing of lock-out receiving relay 43 opens normally closed contacts 71 in the circuit of locking signal transmitting relay 65, thus preventing relay 65 from being energized and thus assuring that original locking oscillator 62 at the master station will not operate at the time that the user is writing at the dispensing station. When lock-out receiving relay 43 is energized, it closes its normally open contacts 131, applying energy to the locking terminal 107. Thus in effect voltage has been applied by the carrier system to locking terminal 107 at the master station, while at the same time original locking oscillator 62 at the master station is rendered inoperative. When the telautograph at the dispensing station is energized it applies signal voltage from signal terminal 106 to the input side of signal oscillator 61, which sends out a signal carrier wave through signal filter 124 and composite set 100 to the master station. The carrier wave at the master station passes through telephone terminals, passes through signal filter 124 and through signal relay 120 whose circuit has been closed by the energization of lock-out receiving relay 43. Energization of signal relay 120 now occurs, which opens normally closed contacts 116 to signal oscillator 61 and closes its normally open contacts 117, applying voltage from the source at the master station (which is continuously connected to the master station) to signal terminal 106 by means of the operation of the carrier system.

In the meantime the writing signals are transmitted through telegraph terminals of the composite set at the dispensing station to the telegraph terminals of the composite set at the master station, thus filling in both duplicate originals of the insurance policy or other contract.

At any time during operation of the telautograph, the customer may desire information which is not included in the instructions. He can then use the telephone to communicate with the operator at the master station, the telephone current passing through telephone filter 115 without interfering in any way with the telautograph. At the receiving station, a similar telephone filter 115 filters out all telautograph carrier waves and passes the telephone current to the telephone 72.

At any time the user may communicate information by telephone to the master station and when the user lays down the pen at the dispensing station, the operator at the master station can continue to fill out and sign the policy. In this case the dispensing station ceases to send out a locking signal as soon as the user lays down his pen, although all other stations remain locked out due to the operation of system lock-out oscillator 152. As soon as the operator at the master station takes up the pen, a locking signal is transmitted from locking terminal 107 to the dispensing station by reason of the energization of locking signal transmitting relay 65 which puts original locking oscillator 62 in operation. From then on until the operator at the master station lays down his pen, the master station acts as the sending station and the dispensing station acts as the receiving station in exactly the reverse relationship to that previously described.

At the end of the filling out of the policy assuming the policy has been paid for by the coins deposited in the telephone coin box the insurance company operator at the master station signs the policy, thus completing it. If the policy is not to go into effect until a check or the like is received, this operation can be deferred until the user sends in his check. A blank check can, if desired, be included in the policy form. Thus the purchaser can complete and sign or the purchaser can sign a check prepared and returned to the master station. The insurance company representative can write on the policy to indicate that the policy will not go into effect until the check has been honored and the premium is received. Likewise, if it is found that the customer is entitled to a refund of money deposited, this information can also be written on the policy by the insurance company operator (representative or agent). Thus the transaction can be completed in a few minutes and is very economical of time. When the policy has been completely filled in, and the customer has returned the pen to its holder to close normally closed contacts 145', the operator at the master station pushes policy release switch 175 (Figure 10). This energizes relay 176 and forward step 177. Forward step relay 177 has a normally open contact 181 (Figure 11) across the paper advance terminals of the telautograph which advance the forms at both stations by step motion as well known in the art. A second normally open contact 185 of forward step relay 177 energizes reset step relay 180 and a normally closed contact 178 of reset step relay 180 opens and deenergizes forward step relay 177. Thus step relays 177 and 180 energize alternately and successively cause the opening and closing of paper advance contacts 181 so that the paper at the dispensing station and at the master station feeds forward in successive steps.

As soon as the paper begins its advance, it closes paper limit switch 182, in series with normally open contacts 184 of release relay 176, thus holding release relay 176 in operation notwithstanding that the policy release switch merely makes contact for a few moments.

At each time after the contacts of forward step relay 177 opens, the policy advance mechanism of the telautograph resets for the next forward step as well known. This cycle is repeated until the paper form causes paper limit switch 182 to open (Figure 12). This stops the advance of the contract forms at both stations. The operator at the master station can at any time stop the advance of the contract forms by opening the stop switch 183 to open the circuit of release relay 176 and step relay 177 or 180, whichever one is operating at the moment.

As the policy at the dispensing station is fed out of the machine, normally closed paper limit switch 81 opens (Figure 8), and then a notch or opening in the policy allows paper limit switch 75 to close. This energizes paper knife solenoid 76, cutting off the completed policy (Figure 6). This also energizes dispensing station control relay 78 which holds itself closed by normally open contacts 80. The policy in its final advance from the machine opens paper limit switch 75.

When a customer pulls the completed form out of the machine, paper limit switch 81 (which was formerly open) is allowed to close. This energizes door closing relay 82 through paper limit switch 81 and contact 80 of dispensing station control relay 78. Contacts 95 of door closing relay 82 energizes door closing motor 96, which causes the door to close. Normally closed contact 86 of door closing relay 82 keeps the door opening motor 87 deenergized when the door closes enough to allow door opening limit switch 85 to close. When door closing limit switch 83 is operated by the closed door, release relay 26 is energized through closed contact 98 of relay 78. Normally closed contacts 25 of release relay 26 open and deenergize cycle starting relay 27. This deenergizes all the relays and power supplies at the dispensing station except terminals 28, 30. The latch holds the door closed until a new coin is inserted.

After the customer has removed the policy and the door has been closed at station X, the operator at the central station pushes reset button 147. This deenergizes system lock-out relay 146 and normally open contacts 148 open, deenergizing system locking oscillator 152 which unlocks all the other stations. Normally open contacts 166 (Figure 10) also open, deenergizing line switching relay X157. The system is then available for operation by insertion of a coin at any one of the dispensing stations. In case the coin is inserted at station Y, station Y operates exactly after the manner of station X already described, and station X and all other stations are locked out.

It will be evident that the machine operates in a very simple and effective manner to dispense a policy or contract at low cost.

While the invention may in many instances have its widest application in connection with the sale of insurance and the making of contracts, it will be understood that it is also applicable in other fields of activity. For example, it may be used by accountants in conducting the account of small businesses, the master station being placed at the accountant's office, and the individual dispensing stations being located in the offices of customers, at which points the transactions of the customers can be recorded for the guidance of the accountants.

The invention may similarly be used in any other business in which information capable of being written is to be transmitted to or from a master station by or to individual dispensing stations.

In view of my invention and disclosure variations and modifications to meet individual whim or particular need will doubtless become evident to others skilled in the art, to obtain all or part of the benefits of my invention without copying the structure and process shown, and I, therefore, claim all such insofar as they fall within the reasonable spirit and scope of my claims.

Having thus described my invention what I claim as new and desire to secure by Letters Patent is:

1. In a contract sales machine, a telautograph system including a telautograph dispensing station and a telautograph master station each having power terminals, right and left hand writing terminals, a signal terminal and a locking terminal, a composite set at each station having telephone terminals, telegraph terminals and outgoing terminals, a pair of wires connecting the outgoing terminals of the sets, the left and right hand writing telautograph terminals being connected to the telegraph terminals of the composite set at each station, a pair of oscillators at each station having different frequencies, each connected at its input side to the telautograph station, a filter critical to the frequency of each oscillator interposed between each oscillator and the supplemental terminals of the composite set at each station, a relay connected across each filter on the side remote from the composite set and responsive to the output thereof, and a current source connected through the relay contacts when closed to the telautograph terminal to which is connected that oscillator which feeds the filter from which the relay receives its output, and connected to the power terminals.

2. In a contract sales machine, a telautograph system including a telautograph dispensing station and a telautograph master station each having power terminals, right and left hand writing terminals, a signal terminal and a locking terminal, a composite set at each station having telephone terminals, telegraph terminals and outgoing terminals, a pair of wires connecting the outgoing terminals of the sets, the left and right hand writing terminals being connected to the telegraph terminals of the composite set at each station, a pair of oscillators at each station having different frequencies, each connected at its input side to the telautograph station through one of the other terminals thereof, a filter critical to the frequency of each oscillator interposed between each oscillator and the telephone terminals of the composite set at each station, a relay connected across each filter on the side remote from the composite set, responsive to the output of the filter, and a current source connected through the relay contacts when closed to the telautograph terminal to which is connected the filter from which the relay receives its output and connected to the power terminals, a telephone at each station and a further filter critical to a frequency below the other filters interposed between each telephone and the telephone terminals of the composite set at the station.

3. In a contract sales machine, a telautograph system including a dispensing station and a master station each having power terminals, right and left hand writing terminals, a signal terminal and a locking terminal, a composite set at each station having telephone terminals, telegraph terminals and outgoing terminals, a pair of wires connecting the outgoing terminals of the composite sets, the right and left hand writing telautograph terminals being connected to the telegraph terminals of the composite set at each station, a power source at each station, connections from the power source to the power terminals of the telautograph at each station, a first oscillator at each station having a particular frequency range, a connection from the signal terminal of the telautograph at each station to the input side of the first oscillator and from the input side of the first oscillator to the opposite side of the power source, a first filter interposed between the output side of the first oscillator at each station and the telephone terminals of the composite set and critical to the frequency of the first oscillator, a first relay across the side of the first filter remote from the composite set at each station and having contacts connecting the signal terminal to the source of power, a second oscillator at each station critical to a different frequency range, a connection from the locking terminal of the telautograph at each station to the input side of the second oscillator and from the input side of the second oscillator to the opposite side of the power source, a second filter interposed between the output side of the second oscillator at each station and the telephone terminals of the composite set and critical to the frequency of the second oscillator and a second relay across the side of the second filter remote from the composite set at each station and having contacts connecting the locking terminal to the source of power.

4. In a contract sales machine, a telautograph system including a dispensing station and a master station, each having power terminals, right and left hand writing terminals, a signal terminal and a locking terminal, a composite set at each station having telephone terminals, telegraph terminals and outgoing terminals, a pair of wires connecting the outgoing terminals of the composite sets, the right and left hand writing telautograph terminals being connected to the telegraph terminals of the composite set at each station, a direct current source at each station, oscillators of different frequencies at one of the stations, filters critical to the different frequencies interposed between the output side of each oscillator and the telephone terminals of the composite set, similar filters connected in parallel to the telephone terminals of the composite set at the other station, and relays at the other station respectively connected across the sides of the filters remote from the composite set and having contacts and connections which connect the signal terminal and the locking terminal at the other station to the power source when the relays are energized.

5. In a contract sales machine, a telautograph system including a dispensing station and a master station, each having power terminals, right and left hand writing terminals, a signal terminal and a locking terminal, a composite set at each station having telephone terminals, telegraph terminals and outgoing terminals, a pair of wires connecting the outgoing terminals of the composite sets, the right and left hand telautograph terminals being connected to the telegraph terminals of the composite set at each station, a direct current power source at each station, connections from the power source to the power terminals of the telautograph at each station, a pair of oscillators at each station having different frequencies, filters critical to the frequencies of the oscillators interposed respectively between each oscillator and the telephone terminals of the composite set, relays connected to the filters on the side remote from the composite sets, each having normally closed and normally open contacts, connections through one of the normally closed contacts of one of the relays from the signal terminal at each station to the input side of one of the oscillators and from that oscillator to the one side of the source, connections through the normally closed contacts of the other relay from the locking terminal at each station to the input side of the other oscillator and therefrom to the one side of the source, connections from the signal terminal of each telautograph station through the normally open contacts of the first relay to the other side of the source and connections from the locking terminal of each telautograph station through the normally open contacts of the second relay to the other side of the source.

6. In a contract sales machine, a telautograph system including a dispensing station and a master station, each having power terminals, right and left hand writing terminals, a signal terminal and a locking terminal, a composite set at each station having telephone terminals, telegraph terminals and outgoing terminals, a pair of wires connecting the outgoing terminals of the composite sets, the right and left hand writing telautograph terminals being connected to the telegraph terminals of the composite set at each station, a direct current power source at each station, connections from the power source to the power terminals of the telautograph at each station, a pair of oscillators at each station having different frequencies, filters critical to the frequencies of the respective oscillators interposed respectively between each oscillator and the telephone terminals of the composite set, first and second relays respectively connected to the filters on the side remote from the composite sets, each having normally closed and normally open contacts, connections through the normally closed contacts of the first relay from the signal terminal at each station to the input side of one of the oscillators and from that oscillator to the other side of the source, connections through the normally closed contacts of the second relay from the locking terminal at each station to the input side of the other oscillator and from the input side of the other oscillator to the other side of the source, connections from the signal terminals of each telautograph station through the normally open contacts of the first relay to one side of the source and connections from the locking terminal of each telautograph station through the normally open contacts of the second relay to one side of the source, and a third relay in circuit between the locking terminal and the other side of the source having normally closed contacts in circuit with the electromagnet of the second relay, the second relay having normally open contacts in circuit with the electromagnet of the first relay.

7. In a telautograph system, telautograph stations at both ends having power terminals, left and right hand writing terminals, a signal terminal and a locking terminal, a composite set at each station having telephone terminals, telegraph terminals, and outgoing terminals, a pair of wires connecting the outgoing terminals at the two ends, an oscillator at the sending end operatively connected to the signal terminal, an oscillator at the sending end operatively connected to the locking terminal, filters interposed between output sides of each of the oscillators and the telephone terminals of the composite set, connections from the right and left hand writing terminals of the telautograph stations at each end to the telegraph terminals of the respective composite sets, filters selective to the frequencies of the respective oscillators connected to the telephone terminals of the composite set at the receiving end and adapted to segregate carrier frequencies passing through the respective filters, a direct current power source, and switching means responsive to the carrier frequencies passing through the respective filters at the receiving end and respectively connected to the signal terminal, to the locking terminal and to the power source to apply the voltage from the power source to the respective terminals in response to the carrier frequencies.

8. In a telautograph system, telautograph stations at both ends having power terminals, left and right hand writing terminals, a signal terminal and a locking terminal, a composite set at each station having telephone terminals, telegraph terminals and outgoing terminals, a pair of wires connecting the outgoing terminals at the two ends, an oscillator at the sending end operatively connected to the signal terminal, an oscillator at the sending end operatively connected to the locking terminal, filters interposed between the output sides of each of the oscillators and the telephone terminals of the composite set, connections from the right and left hand writing terminals of the telautograph stations at each end to the telegraph terminals of the respective composite sets, filters selective to the frequencies of the respective oscillators connected to the telephone terminals of the composite set at the receiving end and adapted to segregate carrier frequencies passing through the respective filters, a direct current power source, switching means responsive to the carrier frequencies passing through the respective filters at the receiving ends and respectively connected to the signal terminal, to the locking terminal and to the power source to apply the voltage from the power source to the respective terminals in response to the carrier frequencies, a telephone at each end of the system and a filter interposed between the telephone and the telephone terminals of the composite set at the respective ends, having an upper cutoff frequency below the carrier frequencies.

9. In a contract vending machine, a plurality of telautograph stations, each having a telautograph provided with left and right hand writing terminals, a locking terminal, a signal terminal and power terminals, a composite set at each station having telegraph terminals, telephone terminals and outgoing terminals connected to the outgoing terminals of the other stations, connections between the right and left hand writing terminals and the telegraph terminals of each station, a locking filter critical to a particular frequency connected to the telephone terminals at each station, a signal filter critical to a different frequency and connected to the telephone terminals at each station, a locking oscillator having output connections to the locking filter on the side remote from the composite set, a signal oscillator having output connections to the signal filter on the side remote from the composite set, and switching means at each station for energizing the oscillators at the sending station and for deenergizing the oscillators at the receiving stations, connecting the locking terminal to the locking filter and the signal terminal to the signal filter.

10. In a contract vending machine, a plurality of telautograph stations, each having a telautograph provided with left and right hand writing terminals, a locking terminal, a signal terminal and power terminals, a composite set at each station having telegraph terminals, telephone terminals and outgoing terminals connected to the outgoing terminals of the other stations, connections between the right and left hand writing terminals and the telegraph terminals, a locking filter critical to a particular frequency connected to the telephone terminals at each station, a signal filter critical to a different frequency and connected to the telephone terminals at each station, an original locking oscillator having output connections to the locking filter on the side remote from the composite set, a signal oscillator having output connections to the signal filter on the side remote from the composite set, a locking signal transmitting relay at each station operatively connected from the locking terminal to the original locking oscillator, a signal relay in one position connecting the signal oscillator to the signal terminal and to one side of the source and in the other position disconnecting the signal oscillator from the signal terminal and connecting the signal terminal to the other side of the source and a lockout receiving relay operatively connected to place the signal relay in circuit across the side of the signal filter remote from the composite set and to deenergize the original locking oscillator and connect the locking terminal to the other side of the source.

11. In a contract vending machine, a plurality of telautograph stations, each having a telautograph provided with left and right hand writing terminals, a locking terminal, a signal terminal and power terminals, a composite set at each station having telegraph terminals, telephone terminals and outgoing terminals connected to the outgoing terminals of the other stations, connections between the right and left hand writing terminals and the telegraph terminals, a locking filter critical to a particular frequency connected to the telephone terminals at each station, a signal filter critical to a different frequency and connected to the telephone terminals at each station, a locking oscillator having output connections to the locking filter on the side remote from the composite set, a signal oscillator having output connections to the signal filter on the side remote from the composite set, a cycle starting relay connected to the source and adapted to apply current to the locking oscillator, a locking shift relay in circuit from the locking terminal to one side of the source and having holding contacts, contacts breaking the connection through the contacts of the cycle starting relay to the locking oscillator and locking signal transmitting relay energizing contacts, a locking signal transmitting relay in circuit with the locking signal transmitting relay energizing contacts of the locking shift relay from the locking terminal to one side of the source and having contacts which complete the circuit from the locking terminal through the input of the locking oscillator to one side of the source.

12. In a contract vending machine, a plurality of telautograph stations, each having a telautograph provided with left and right hand writing terminals, a locking terminal, a signal terminal and power terminals, a composite set at each station having telegraph terminals, telephone terminals and outgoing terminals connected to the outgoing terminals of the other stations, connections between the right and left hand writing terminals and the telegraph terminals, a locking filter critical to a particular frequency connected to the telephone terminals at each station, a signal filter critical to a different frequency and connected to the telephone terminals at each station, an original locking oscillator having output connections to the locking filter on the side remote from the composite set, a signal oscillator having output connections to the signal filter on the side remote from the composite set, a cycle starting relay connected to the source and adapted to apply current to the locking oscillator, a locking shift relay in circuit from the locking terminal to one side of the source and having holding contacts, contacts breaking the connection through the contacts of the cycle starting relay to the original locking oscillator and locking signal transmitting relay energizing contacts, a locking signal transmitting relay in circuit with the locking signal transmitting relay energizing contacts of the locking shift relay from the locking terminal to one side of the source and having contacts which complete the circuit from the locking terminal through the input of the original locking oscillator to one side of the source, and having locking receiving relay control contacts, a locking receiving relay connected to the locking filter on the side remote from the composite set and having signal relay control contacts and contacts which disconnect the input of the locking oscillator, the locking receiving relay being connected through the locking receiving relay control contacts to the locking filter remote from the composite set and a signal relay connected through the signal relay control contacts to the signal filter on the side remote from the composite set, having contacts which connect the signal terminal through the signal oscillator to one side of the source and contacts which connect the signal terminal to the other side of the source.

13. In a contract vending machine, a plurality of dispensing stations and a master station, each having a telautograph provided with left and right hand writing terminals, a locking terminal and power terminals, a direct current power source connected to the power terminals, a composite set at each station having telegraph terminals, telephone terminals and outgoing terminals connected between each dispensing station and the master station, connections between the left and right hand writing terminals and the telegraph terminals at each station, a locking filter in each station connected to the telephone terminals, an original locking oscillator at each dispensing station connected at the output to the locking filter on the side remote from the composite set, means for energizing the original locking oscillator at a particular dispensing station, a lock-out receiving relay at each station connected to the locking filter on the side remote from the composite set, and having in each dispensing station contacts disconnecting the input of the original locking oscillator and connecting the locking terminal with the source, the lock-out receiving relay at the master station having system locking contacts, a system locking oscillator at the master station, means for energizing the system locking oscillator when the system locking contacts close and switching means for connecting the lines of all locked out dispensing stations to the system locking oscillator.

14. In a contract vending machine, a plurality of dispensing stations and a master station, each having a telautograph provided with left and right hand writing terminals, a locking terminal and power terminals, a direct current power source connected to the power terminals, the composite set at each station having telegraph terminals, telephone terminals and outgoing terminals connected between each dispensing station and the master station, connections between the left and right hand writing terminals and the telegraph terminals, a locking filter in each station connected to the telephone terminals, an original locking oscillator at each dispensing station connected at its output to the locking filter on the side remote from the composite set, means for energizing the original locking oscillator at a particular dispensing station, a lock-out receiving relay at each station operatively connected to the locking filter on the side remote from the composite set, operatively connected to the original locking oscillator to disconnect the same and operatively connected to the locking terminal to apply current thereto, the lock-out receiving relay in the master station including system locking contacts, a system locking oscillator, a system lock-out relay in circuit with the system lock-out contacts and having contacts which energize the system locking oscillator and means actuated by the system lock-out relay for switching the lines of all stations which are to be locked out to the output of the system locking oscillator and switching the lines of the dispensing station in use to the incoming terminals of the composite set.

15. In a contract vending machine, a plurality of dispensing stations and a master station, each having a telautograph provided with left and right hand writing terminals, a locking signal and power terminals, a direct current power source connected to the power terminals, the composite set at each station having telegraph terminals, telephone terminals and outgoing terminals connected between each dispensing station and the master station, connections between the left and right hand writing terminals and the telegraph terminals, a locking filter in each station connected to the telephone terminals, an original locking oscillator at each dispensing station connected at its output to the locking filter on the side remote from the composite set, means for energizing the original locking oscillator at a particular dispensing station, a lock-out receiving relay at each station operatively connected to the locking filter on the side remote from the composite set, operatively connected to the original locking oscillator to disconnect the same and operatively connected to the locking terminal to apply current thereto, the lock-out receiving relay in the master station including system locking contacts, a system locking oscillator, a system locking relay in circuit with the system locking contacts and having contacts which energize the system locking oscillator, an auxiliary filter control relay in circuit with contacts of the system locking relay and having contacts which disconnect all lines from the composite set of the master station and having auxiliary filter control contacts, auxiliary filters critical to the locking frequency of each pair of lines to the master set connected to the lines through the auxiliary filter control contacts, auxiliary filter locking signal relays connected to the respective auxiliary filters on the sides remote from the lines to the stations, and means operated by a particular auxiliary filter locking signal relay when it is energized for switching the particular line to the incoming terminals of the master composite set and leaving all other lines connected to the master locking oscillator.

16. In a contract vending machine, a plurality of dispensing stations and a master station, each having a telautograph provided with left and right hand writing terminals, a locking terminal and power terminals, a direct current power source connected to the power terminals, the composite set at each station having telegraph terminals, telephone terminals and outgoing terminals connected between each dispensing station and the master station, connections between the left and right hand writing terminals and the telegraph terminals, a locking filter in each station connected to the telephone terminals, an original locking oscillator at each dispensing station connected at its output to the locking filter on the side remote from the composite set, means for energizing the original locking oscillator at a particular dispensing station, a lock-out receiving relay at each station operatively connected to the locking filter on the side remote from the composite set, operatively connected to the original locking oscillator to disconnect the same and operatively connected to the locking terminal to apply current thereto, the locking receiving relay in the master station including system lock-out contacts, a system lock-out oscillator, a system lock-out relay in circuit with the system locking contacts and having contacts which energize the system locking oscillator, an auxiliary filter control relay in circuit with contacts of the system lock-out relay and having contacts which disconnect all lines from the composite set of the master station, and having auxiliary filter control contacts, auxiliary filters critical to the locking frequency for each pair of lines to the master set connected to the lines through the auxiliary filter control contacts, auxiliary filter locking signal relays connected to the respective auxiliary filters on the sides remote from the lines to the stations, a line switch relay for each dispensing station in circuit across the source with the auxiliary filter locking signal relay, having a position connecting the incoming line to the master composite set and a position connecting the incoming line to the output of the master locking oscillator and having relay connections which open the circuit of the individual auxiliary filter locking signal relays.

17. In a contract vending machine, a plurality of dispensing stations and a master station, each having a teleautograph provided with left and right hand writing terminals, a locking terminal, a signal terminal and power terminals, a direct current power source connected to the power terminals, a composite set at each station having telegraph terminals, telephone terminals and outgoing terminals connected between each dispensing station and the master station, connections between the left and right hand writing terminals and the telegraph terminals, a locking filter in each station connected to the telephone terminals, an original locking oscillator at each dispensing station connected at its output to the locking filter on the side remote from the composite set, a lock-out receiving relay at each station responsive to the carrier wave passing through the locking filter and disconnecting the original locking oscillator and applying locking current to the locking terminal, a locking signal transmitting relay at each station energizing the original locking oscillator and disconnecting the lock-out receiving relay, a signal filter at each station responsive to a different frequency and connected to the telephone terminals of the composite set, a signal oscillator connected to the signal filter on the side remote from the composite set and generating the frequency of the signal filter, a signal relay at each station energized by the carrier wave through the signal filter, and when energized disconnecting the signal oscillator and connecting the signal terminal to one side of the source, system locking contacts on the lockout receiving relay of the master set, a system locking oscillator for the master set, a system locking relay in the master set energized through the system locking contacts, having holding contacts and having contacts which energize the system locking oscillator and having auxiliary filter control contacts, an auxiliary filter control relay energized by the auxiliary filter control contacts having holding contacts and having disconnecting contacts in each line to the master set and auxiliary filter contacts for each line, an auxiliary filter responsive to the locking frequency connected to each line from the dispensing station through the auxiliary filter contacts, an auxiliary filter locking signal relay for each auxiliary filter connected thereto on the side remote from the line, having a line switching contact and a relay contact which opens the circuit of the auxiliary filter locking signal relay, and a line switching relay for each line in circuit with the auxiliary filter locking signal relay across the source and with contacts of the system locking relay, having connections in one position directly from the incoming line to the incoming terminals of the composite set and in another position to the output of the system locking oscillators.

18. In a contract vending machine, a teleautograph system having at each station left and right hand writing terminals, a locking terminal, a signal terminal and power terminals, a composite set at each station having telephone terminals, telegraph terminals, and outgoing terminals connected to the outgoing terminals of the other stations, a direct current power source connected to the power terminals, connections between the left and right hand writing terminals and the telegraph terminals, a locking filter connected to the telephone terminals of the composite set at the individual stations, an original locking oscillator having the same frequency as the locking filter connected to the power source and to the locking filter on the side remote from the composite set, a locking signal transmitting relay at each of the stations operatively connecting the original locking oscillator with the power source, check controlled switch means at certain stations for energizing the locking signal transmitting relay, a lock-out receiving relay at each station operatively connected to the locking filter on the side remote from the composite set, a system locking oscillator at one station placed in operation by the lock-out receiving relay and connected to the lock-out receiving relay of other stations and solenoid means put in operation by the lock-out receiving relay for preventing deposit of a check in some of the stations.

19. In a contract vending machine, a teleautograph system having at each station left and right hand writing terminals, a locking terminal, a signal terminal and power terminals, a composite set at each station having telephone terminals, telegraph terminals, and outgoing terminals connected to the outgoing terminals of the other stations, a direct current power source connected to the power terminals, connections between the left and right hand writing terminals and the telegraph terminals, a locking filter connected to the telephone terminals of the composite set at the individual stations, an original locking oscillator having the same critical frequency as the locking filter connected to the power source and to the locking filter on the side remote from the composite set, a locking signal transmitting relay at each of the stations operatively connecting the original locking oscillator with the power source, check controlled switching means at certain stations for energizing the locking signal transmitting relay, a lock-out receiving relay at each station operatively connected to the locking filter on the side remote from the composite set, a system lock-out oscillator at one station put in operation by the lock-out receiving relay and connected to the lock-out receiving relays of other stations, and solenoid means put in operation by the lock-out receiving relay for signalling that the system is busy at stations where the locking signal transmitting relay is not energized.

20. In a contract vending machine, a check operated switch, a power source, a cycle starting relay in circuit with the check operated switch across the power source, a teleautograph dispensing station comprising left and right hand writing terminals, a locking terminal, a signal terminal and power terminals, a composite set having telegraph terminals, telephone terminals and outgoing terminals, connections between the left and right hand writing terminals and the telegraph terminals, a direct current generator placed in operation by the cycle starting relay and connected with the power terminals, a locking filter responding to a particular frequency and connected to the telephone terminals, an original locking oscillator generating the same frequency and connected to the locking filter on the side remote from the composite set, a signal filter responding to a different frequency and connected to the telephone terminals of the composite set, a signal oscillator generating the frequency of the signal filter and connected to the signal filter on the side remote from the composite set, a power supply for the locking oscillator and the signal oscillator placed in circuit by the cycle starting relay and switching means placed in operation by the cycle starting relay for connecting the locking oscillator to the power source and for connecting the input side of the signal oscillator to the signal terminal and to one side of the generator.

21. In a dispensing station of a contract vending machine, a teleautograph having left and right hand writing terminals, a locking terminal, a signal terminal and power terminals, a composite set having telegraph terminals, telephone terminals and outgoing terminals, a check controlled switch, a source of electric power, a cycle starting relay in series with the check controlled switch across the source, a locking filter responsive to a critical frequency connected to the telephone terminals, an original locking oscillator generating the particular frequency of the locking filter and connected to the locking filter on the side remote from the composite set, switching means including contacts of the cycle starting relay for energizing the original locking oscillator when the cycle starting relay is energized, a signal filter critical to a different frequency and connected to the telephone terminals of the composite set, a signal oscillator generating the frequency of the signal filter, a lockout receiving relay connected to the locking filter on the side remote from the composite set, a signal relay connected to the signal filter on the side remote from the composite set when the lockout receiving relay is energized and having normally closed contacts connecting the signal terminal to the signal oscillator input and normally open contacts connecting the signal terminal to one side of the source when the signal relay is energized, the lockout receiving relay having normally open contacts connecting the locking terminal to one side of the source when the lockout receiving relay is energized, a generator connected to the power terminals of the teleautograph, power supply connected to the oscillators and contacts on the cycle starting relay which energize the generator for the teleautograph and the power supply for the oscillators.

References Cited in the file of this patent

UNITED STATES PATENTS

| Number | Name | Date |
|---|---|---|
| 1,314,619 | Tiffany | Sept. 2, 1919 |
| 1,326,994 | Tiffany | Jan. 6, 1920 |
| 1,445,421 | Tiffany | Feb. 13, 1923 |
| 1,962,312 | Knoop | June 12, 1934 |
| 2,080,273 | Holmes | May 11, 1937 |
| 2,094,068 | Harrison | Sept. 28, 1937 |
| 2,141,388 | Harrison et al. | Dec. 27, 1938 |
| 2,276,991 | Long et al. | May 17, 1942 |
| 2,352,271 | Lang et al. | June 27, 1944 |